(12) United States Patent
Littmann

(10) Patent No.: US 11,174,785 B2
(45) Date of Patent: Nov. 16, 2021

(54) METHOD FOR STORING ENERGY AND FOR DISPENSING ENERGY INTO AN ENERGY SUPPLY GRID, PRESSURIZED GAS STORAGE POWER PLANT AND COMPUTER PROGRAM

(71) Applicant: ERNEO ENERGIESPEICHERSYSTEME GMBH, Wunstorf (DE)

(72) Inventor: Wolfgang Littmann, Wunstorf (DE)

(73) Assignee: ERNEO ENERGIESPEICHERSYSTEME GMBH, Wunstorf (DE)

(*) Notice: Subject to any disclaimer, the term of this patent is extended or adjusted under 35 U.S.C. 154(b) by 63 days.

(21) Appl. No.: 16/324,718

(22) PCT Filed: Aug. 8, 2017

(86) PCT No.: PCT/EP2017/070085
§ 371 (c)(1),
(2) Date: Feb. 11, 2019

(87) PCT Pub. No.: WO2018/033437
PCT Pub. Date: Feb. 22, 2018

(65) Prior Publication Data
US 2019/0178162 A1    Jun. 13, 2019

(30) Foreign Application Priority Data
Aug. 19, 2016   (DE) ............... 10 2016 115 421.0

(51) Int. Cl.
*F02C 6/16*       (2006.01)
*F01K 3/12*       (2006.01)
(Continued)

(52) U.S. Cl.
CPC ............ *F02C 6/16* (2013.01); *F01K 3/004* (2013.01); *F01K 3/12* (2013.01); *F02C 1/04* (2013.01);
(Continued)

(58) Field of Classification Search
CPC .... F02C 6/16; F02C 1/04; F01K 3/004; F01K 3/12; F22B 1/006; F05D 2220/30; F05D 2210/12
(Continued)

(56) References Cited

U.S. PATENT DOCUMENTS 2,942,411 A * 6/1960 Roi ..................... F01K 3/006
60/641.8
4,353,214 A   10/1982 Gardner
(Continued)

FOREIGN PATENT DOCUMENTS

CN   103 452 612 A    1/2015
DE   26 36 417 A1     2/1978
(Continued)

*Primary Examiner* — Hoang M Nguyen
(74) *Attorney, Agent, or Firm* — W&C IP

(57) ABSTRACT

The invention relates to a method for storing energy and for dispensing energy into an energy supply grid by means of a pressurized gas storage power plant, which has at least one first storage chamber and at least one second storage chamber separate from the first, wherein in order to store energy pressurized gas is taken from the lower-pressure storage chamber, is compressed by means of a compression machine and the compressed pressurized gas exiting the compression machine is routed into the other storage chamber; in order to dispense energy pressurized gas is taken from the higher-pressure storage chamber, is routed through an expansion machine and the expanded pressurized gas exiting the expansion machine is transferred into the other storage chamber, wherein the expansion machine dispenses energy to the energy supply grid, wherein the pressurized gas is
(Continued)

heated by means of a heating device prior to or upon supply to the expansion machine. The invention also relates to a corresponding pressurized gas storage power plant and to a computer program for carrying out the method.

11 Claims, 1 Drawing Sheet

(51) Int. Cl.
*F01K 3/00* (2006.01)
*F02C 1/04* (2006.01)
*F22B 1/00* (2006.01)

(52) U.S. Cl.
CPC ...... *F05D 2210/12* (2013.01); *F05D 2220/30* (2013.01); *F22B 1/006* (2013.01)

(58) Field of Classification Search
USPC .................................... 60/641.2–641.4, 659
See application file for complete search history.

(56) References Cited

U.S. PATENT DOCUMENTS

| | | | |
|---|---|---|---|
| 7,047,744 B1* | 5/2006 | Robertson | F01K 25/08 290/52 |
| 8,627,665 B2* | 1/2014 | Ruer | F01K 3/12 60/650 |
| 9,518,786 B2* | 12/2016 | Howes | F02C 6/16 |
| 9,896,975 B1* | 2/2018 | Darvishian | F01K 25/08 |
| 2010/0251712 A1 | 10/2010 | Nakhamkin | |
| 2015/0000248 A1 | 1/2015 | del Omo | |
| 2015/0091301 A1* | 4/2015 | Littmann | F03D 9/17 290/7 |

FOREIGN PATENT DOCUMENTS

| | | |
|---|---|---|
| DE | 10 2012 102 897 A1 | 6/2013 |
| DE | 10 2014 008 120 A1 | 12/2015 |
| FR | 2 981 400 A1 | 4/2013 |

* cited by examiner

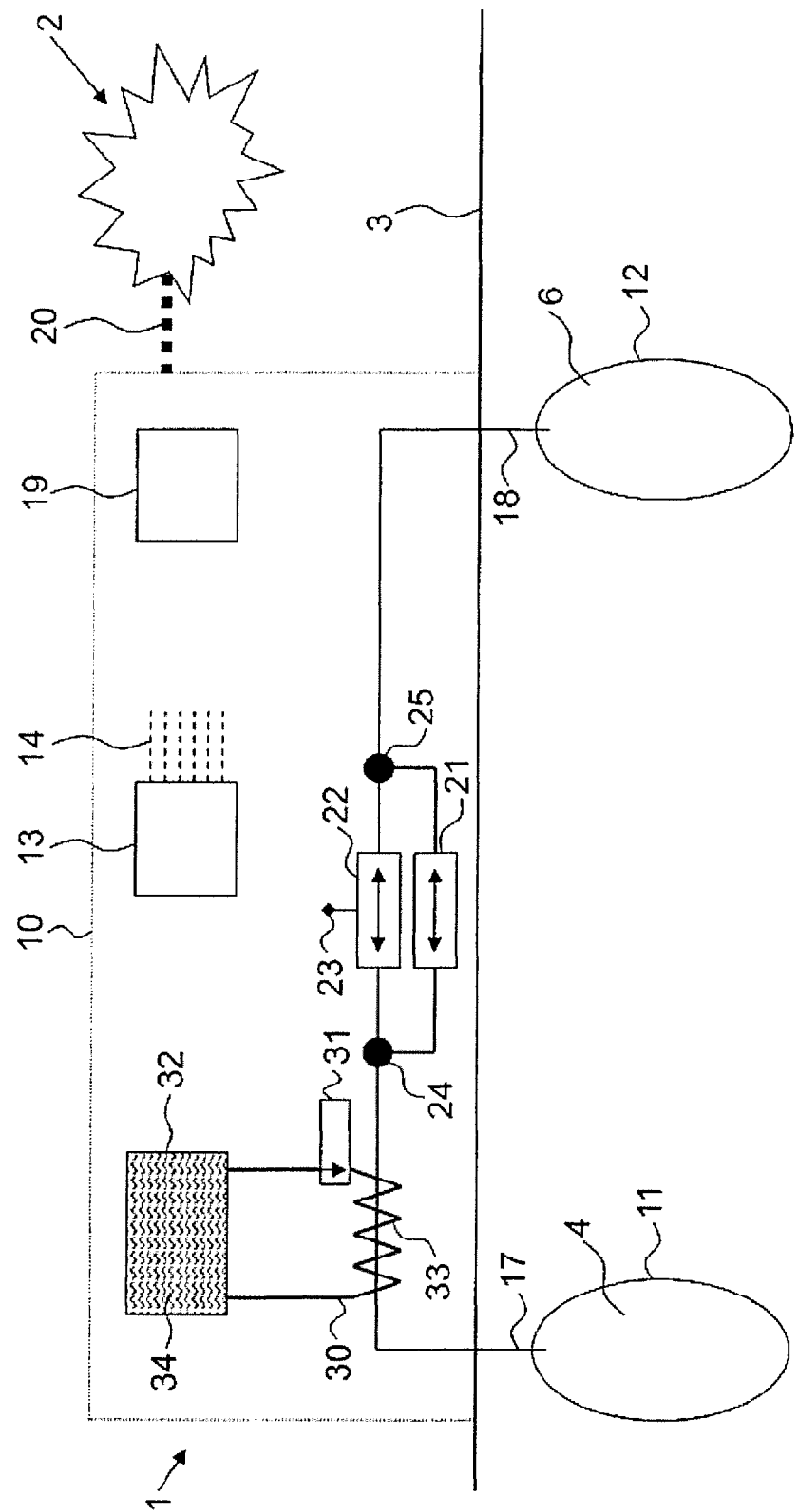

METHOD FOR STORING ENERGY AND FOR DISPENSING ENERGY INTO AN ENERGY SUPPLY GRID, PRESSURIZED GAS STORAGE POWER PLANT AND COMPUTER PROGRAM

The invention relates to a method for storing energy and for dispensing energy into an energy supply grid by means of a pressurized gas storage power plant, which has at least one first storage chamber and at least one second storage chamber separate from the first, wherein, in order to store energy, pressurized gas is taken from the lower-pressure storage chamber and compressed by means of a compression machine, and the compressed pressurized gas exiting the compression machine is routed into the other storage chamber, and, in order to dispense energy, pressurized gas is taken from the higher-pressure storage chamber and is routed through an expansion machine, and the expanded pressurized gas exiting the expansion machine is transferred into the other storage chamber, wherein the expansion machine dispenses energy to the energy supply grid. The invention furthermore relates to a corresponding pressurized gas storage power plant and to a computer program for carrying out the method.

In general, the invention relates to the field of energy storage for energy produced from regenerative sources, e.g. wind power or solar power. Since these types of energy generation are subject to irregularities due to the weather, the need for energy storage is becoming ever more important. In addition to electrochemical storage, which is relatively expensive, there are already proposals to implement storage in the form of mechanical energy, e.g. in pumped storage hydroelectric power plants or compressed-gas storage power plants. Pumped storage power plants have hitherto been limited in location by aboveground geological conditions and new projects face problems of social acceptance owing to the visible interference with nature. Compressed air storage power plants are socially acceptable owing to the possibility of installing the cavities underground, but they have hitherto exhibited relatively low efficiencies and thus a low energy efficiency. Pumped storage power plants have hitherto been implemented only in terrain with appropriate differences in height. In terrain such as the North German Plain or in the open sea, where a large proportion of wind energy is generated, the use of conventional pumped storage hydroelectric power plants has proven unrealistic.

The publication "ADELE—Der adiabate Druckluftspeicher für die Elektrizitätsversorgung" [ADELE—The adiabatic compressed air store for electricity supply] by RWE presents a proposal which makes compressed air storage more energy-efficient by storing the heat which is produced during the compression of the air and returning the stored heat to the air during the subsequent release of energy, i.e. the expansion of the compressed air, in order to avoid icing problems and to bring the efficiency of the plant into an acceptable range. However, the authors of this document are aware of the fact that technical challenges arise with the storage and, accordingly, also the expansion of the compressed air, e.g. temperatures of over 600 degrees Celsius. At such temperatures, it is very expensive to optimize the plant to be used, in particular compressors and expansion machines. Moreover, it can be foreseen that efficient heat storage will also present major challenges at such temperatures.

As compared with such approaches, the pressurized gas storage power plants proposed in WO 2013/064276 A2 has already achieved significant progress. There too, a high efficiency is achieved by means of an adiabatic principle of operation, more specifically without the occurrence of the abovementioned extremely high temperatures. This is achieved by virtue of the fact that the at least two storage chambers provide a closed system in which the pressurized gas can be moved backward and forward between one storage chamber and the other without the pressurized gas being released into the atmosphere during the energy-generating expansion. On the contrary, the pressurized gas can be held at a certain minimum pressure level, which is considerably higher than the atmospheric pressure level, as it is pumped from a higher-pressure storage chamber into a lower-pressure storage chamber. The ratio of the compression energy contained in the gas p·V to the temperature difference which arises during compression or expansion is thereby considerably improved. A pressurized gas storage power plant of this kind can also be operated in a particularly efficient way even without special heating and cooling devices, without the occurrence of large temperature changes, e.g. with temperature changes of just a few tens of degrees Celsius, e.g. 10 degrees Celsius to 20 degrees Celsius. Accordingly, an adiabatic pressurized gas storage power plant of this kind can be implemented at considerably lower cost than the ADELE project. To operate, it does not require any storage of the heat which arises during compression. Accordingly, there is also no need to supply any heat when expansion is performed to dispense energy into the energy supply grid. Consistent with this, FIG. 2 of WO 2013/064276 A2, which shows a pressurized gas storage power plant of this kind, accordingly also discloses an arrangement without a heat exchanger or other heating device for heating the pressurized gas. This has the advantage that the pressurized gas storage power plant there is relatively easy to implement technically.

It is therefore the underlying object of the invention to make a pressurized gas storage power plant of the kind known from WO 2013/064276 A2, and a corresponding method for storing energy and dispensing energy, even more efficient.

This object is achieved in the case of a method of the type stated at the outset by virtue of the fact that the pressurized gas is heated by means of a heating device before or during supply to the expansion machine. In contrast to other energy storage methods or power plants, e.g. ADELE, a number of surprising synergistic effects which do not arise with other types of power plant and therefore could not readily be anticipated are achieved by such preheating of the pressurized gas in the adiabatic compressed air storage method according to the invention involving the at least two storage chambers.

As mentioned, the adiabatic pressurized gas energy storage method and the pressurized gas storage power plant according to WO 2013/064276 A2 do not in fact require that there should be heating of the pressurized gas before expansion and, accordingly, no heating device is provided there either. It is possible per se to eliminate the corresponding expenditure. However, example calculations show that an increase in the power output of the expansion machine of around approximately 70% can be achieved even with relatively little heating of the pressurized gas before or during supply to the expansion machine of a few tens of degrees, as will be shown below by means of example calculations. In the example calculations, a temperature increase in the pressurized gas by the heating device of just 25° C. is assumed.

In the case of the method according to the invention, heat can thus be supplied to the pressurized gas in a simple manner in a heat exchange process. Here, relatively small temperature increases of, for example, 10-50 degrees Celsius are sufficient, in contrast to the prior art in different systems. In the process, this supplied heat is converted almost completely into kinetic energy and power.

It can be seen that, in the present invention, considerable improvements in the effectiveness and efficiency of pressurized gas energy storage and energy generation are possible with moderate temperatures. This makes it possible, in particular, to use sources of heat energy which were hitherto left entirely out of account for such types of power plant, where such amounts of heat were classified as "waste heat". By virtue of the method according to the invention and the pressurized gas storage power plant according to the invention, it is now also possible to use such supposed "waste heat" with considerable benefit.

Another advantage is that the systems required to implement the invention and the components thereof can furthermore be of a simple and low-cost kind. There are no special technical requirements on the machines, especially seals, and pipes. The thermal insulation for a heat supply and for heat storage can also be handled easily by conventional means.

In contrast to other proposals, a pure pressurized gas storage method and a corresponding pure pressurized gas storage power plant are thus proposed, with which no additional fuels are required to generate energy (by means of a combustion process). In the case of the present invention, the energy can be dispensed into the energy supply grid exclusively by expanding the pressurized gas by means of the expansion machine. The expansion machine is connected to an electric generator, which dispenses the energy in the form of electric energy into the energy supply grid.

The energy supply grid can be a public and/or private energy supply grid. In this context, direct energy output to power consumers is also counted as an energy supply grid.

The compression machine can be designed as an electrically driven compressor, for example. The pressurized gas can be compressed air, for example, or some other gas or a gas mixture, e.g. natural gas. The heating device can be designed as a heat exchanger and/or as an electric heating element (heating coil), for example.

The method according to the invention, i.e. assisting the expansion process by means of additional heat, can also be carried out with relatively low pressures of the pressurized gas, e.g. if the pressure ratio between the pressures in the first and the second storage chamber is relatively low, i.e. below a ratio of 1 to 5, e.g. no more than 1 to 2 or no more than 1 to 3. As a result, the invention is also suitable for relatively small systems for storing energy, e.g. in domestic dwellings or in relatively small industrial concerns.

The pressures prevailing in the first and the second storage chamber are normally different, and therefore either the first storage chamber or the second storage chamber forms the lower-pressure storage chamber, and the other storage chamber in each case forms the higher-pressure storage chamber. If there are further storage chambers apart from the first and the second storage chamber, these can have further, different pressure levels. The case of equal pressures can also occur in the first and the second storage chamber and, where applicable, further storage chambers, but this is a transitional state which does not normally pertain for long and accordingly is not relevant in practice to the operation of the pressurized gas storage power plant.

According to an advantageous development of the invention, it is envisaged that the pressurized gas is heated by no more than 100 degrees Celsius by the heating device. In this way, the method according to the invention can be operated in temperature ranges which are easy to manage in respect of the components to be used and of thermal insulation. According to an advantageous development of the invention, provision can be made for the pressurized gas to be heated by no more than 50 degrees Celsius, or by no more than 30 degrees Celsius, by the heating device.

According to an advantageous development of the invention, it is envisaged that the pressure ratio (compression ratio) between the pressures in the first and the second storage chamber is no more than 1 to 5. In this way, it is possible to implement an adiabatic pressurized gas storage method in which the efficiency is high and the temperature differences which arise during the compression and expansion of the pressurized gas are kept small. According to an advantageous development of the invention, the pressure ratio can be at most 1 to 4 or at most 1 to 2.5.

The method according to the invention, i.e. assisting the expansion process by means of additional heat, can also be carried out with relatively low pressures of the pressurized gas, e.g. if the pressure ratio between the pressures in the first and the second storage chamber is relatively low, i.e. below a ratio of 1 to 5, e.g. no more than 1 to 2 or no more than 1 to 3. As a result, the invention is also suitable for relatively small systems for storing energy, e.g. in domestic dwellings or in relatively small industrial concerns.

According to an advantageous development of the invention, it is envisaged that the heating device is connected to a heat storage system, in which there is preheated heat storage medium, which is passed through the heating device to heat the pressurized gas. In this way, a heat circuit can be formed. It is possible, in particular, for the heat storage medium to be a liquid medium.

It is not absolutely necessary to use a liquid heat storage medium for the actual heat storage. It is also possible for heat storage to be performed by solids, i.e. with a solid body heat storage device.

According to an advantageous development of the invention, it is envisaged that a liquid with a boiling temperature of no more than 100 degrees Celsius at 1.013 bar atmospheric pressure is used as the heat storage medium. It is thus possible to use water, for example, as the heat storage medium, this having the advantage that it is widely available, easy to handle and environmentally friendly.

According to an advantageous development of the invention, it is envisaged that the pressurized gas is heated by means of the heat produced and stored during the compression of the pressurized gas, by means of energy supplied from renewable energy sources and/or by means of geothermal energy. In this way, the heat required to preheat the pressurized gas can be provided in an advantageous way. The heat can be stored temporarily in the heat storage medium, for example. If the heat is produced by means of energy supplied from renewable energy sources, electric power from wind turbines or solar cell systems can be used for this purpose, for example, and converted into heat by means of an electric heater. It is also possible to use heat obtained directly by sun collectors, for example. In this case, the liquid heated by the sun collectors can be used directly as the heat storage medium. In general, provision can be made for the heat storage medium to be heated by means of the heat produced during the compression of the pressurized gas, by means of energy supplied from renewable energy sources and/or by means of geothermal energy.

According to an advantageous development of the invention, the gas pressure in a storage chamber during the expansion of pressurized gas from said storage chamber is not lowered below a predetermined minimum pressure, e.g. not below 60 to 100 bar. This has the advantage that the energy efficiency of gas pressure storage can be considerably increased over conventional compressed air storage power plants. This is based essentially on the physical effect that precisely the same amount of heat is obtained for the compression of one mole of a gas, e.g. 1 bar to 10 bar, as with a pressure increase from 10 bar to 100 bar, whereas the compression energy p·V contained in the gas at a higher pressure level is correspondingly higher in proportion. By virtue of the fact that it is possible, with the power plant according to the invention, always to carry out gas pressure storage and expansion at relatively high pressure levels overall, a relatively high compression energy can be achieved with, at the same time, only small recurring temperature differences, and therefore lower thermal and mechanical loading of the caverns, lines and machines occurs with such a mode of operation.

According to an advantageous development of the invention, the change in the gas pressure of the pressurized gas with respect to time as the pressurized gas is taken from a storage chamber and/or as the pressurized gas is supplied to a storage chamber is limited to a predetermined value. This has the advantage that the storage chambers which are filled with pressurized gas are protected in the event of a change in gas pressure and that predetermined load limits are observed.

The object stated at the outset is furthermore achieved by a pressurized gas storage power plant having at least one first storage chamber and at least one second storage chamber separate from the first, at least one compression machine, and at least one expansion machine, wherein the compression machine and/or the expansion machine are connected to the first and/or the second storage chamber via pressurized gas lines, either permanently or via switchable valves, wherein the compression machine is set up in the first and/or the second storage chamber for the optional production of a gas pressure of a pressurized gas, and having a heating device, which is designed to heat the pressurized gas before or during supply of the pressurized gas to the expansion machine. By this means too, the advantages explained above can be achieved. In particular, the pressurized gas storage power plant can be designed to carry out a method of the type explained above. This can be achieved, for example, by the pressurized gas storage power plant having a control device, which is designed to control the components of the pressurized gas storage power plant in accordance with a method of the type explained above. The control device can be designed as an electronic control device, for example, e.g. as a computer-controlled control device comprising a processor on which a computer program is executed.

Accordingly, the object stated at the outset is also achieved by a computer program having program code means, designed to carry out a method of the type explained above when the program is executed on a processor, e.g. on a processor of the control device. By this means too, the advantages explained above can be achieved.

The invention is explained in greater detail below by means of an illustrative embodiment, using FIG. 1.

FIG. 1 shows a pressurized gas storage power plant 1, which is connected by electric leads 20 to a public or private electric energy supply grid 2, which can also include direct power suppliers or power consumers. The pressurized gas storage power plant 1 is designed to store excess energy from the energy supply grid 2 over the short, medium or long term and to dispense electric energy to the energy supply grid 2 again when there is an additional energy demand in the energy supply grid 2.

For this purpose, the pressurized gas storage power plant 1 has a first storage chamber 11 and a second storage chamber 12. The first and/or the second storage chamber 11, 12 can be arranged underground, i.e. at a significant depth below the Earth's surface 3, or overground or in the region of the Earth's surface 3.

The pressurized gas storage power plant 1 has a number of units which, by way of example, are arranged overground, i.e. above the Earth's surface 3, in FIG. 1 and can be grouped in a power plant block 10. The power plant block 10 can be designed as a power plant building, for example. Of course, it is also possible for individual units or all the units to be arranged close to the surface or at a relatively great depth under the Earth's surface 3. For reasons of practical implementation of the pressurized gas storage power plant, however, there are advantages in arranging the units above ground.

In the power plant block 10 there is a control device 13, which can be designed, for example, as a control processor or master processor of the pressurized gas storage power plant 1, e.g. in the form of a computer. The control device 13 is connected by symbolically illustrated electric leads 14 to the individual units in order to control said units or to record measurement data from said units. The control device 13 is furthermore connected by the lines 14 to an energy demand interface, via which energy storage demands and energy output demands can be received from the outside, e.g. from power plant operators or energy suppliers. The control device 13 processes these demands and controls the units according to the demand in such a way that electric energy from the energy supply grid 2 is either stored in the pressurized gas storage power plant 1 or is dispensed from the latter back to the energy supply grid 2.

In particular, the pressurized gas storage power plant 1 has the following units. An expansion machine 21 and a compression machine 22 are connected by means of a controllable valve arrangement 24 to a pressurized gas line 17 leading into the first storage compartment 11 on one side and to a pressurized gas line 18 leading into the second storage compartment 12 on the other side. The expansion machine 21 can be a gas turbine with a generator, for example, and the compression machine 22 can be an electrically driven compressor, for example. The compression machine 22 is indicated by a double headed arrow since, depending on the control of the controllable valve arrangement 24, 25 by the control device 13, it is capable of delivering pressurized gas from the first control chamber 11 to the second control chamber 12 and, in the process, of increasing the gas pressure in the second storage compartment 12 and, conversely, in a corresponding manner, of delivering pressurized gas from the second storage compartment 12 to the first storage compartment 11. The compression machine 22 is activated when energy is to be fed into the pressurized gas storage power plant 1 from the energy supply grid 2. The compression machine 22 can be connected to a connection 23, for example, via which additional pressurized gas can be fed into the pressurized gas circuit when required from the atmosphere or from a gas grid connected to the connection 23.

If energy is to be dispensed to the energy supply grid 2, pressurized gas is transferred from a storage compartment with a higher gas pressure into a storage compartment with a lower gas pressure by means of the expansion machine 21. In this case, the expansion machine 21 is activated by controlling the controllable valve arrangements 24, 25. The expanding pressurized gas flowing through the expansion machine 21 makes it possible for electric energy to be generated by the expansion machine 21 and output to the energy supply grid 2. The expansion machine 21 is or can likewise be connected to the connection 23 in order to release any excess quantities of gas in the pressurized gas system.

The pressurized gas storage power plant 1 has a heating device 33, e.g. in the form of a heat exchanger, by means of which the pressurized gas 4 routed from storage chamber 11 to the expansion machine 21 can be preheated. If the pressurized gas storage power plant 1 is always operated in such a way that storage chamber 11 has a higher pressure than storage chamber 12, the single heating device 33 at the position illustrated in FIG. 1 is sufficient. If the pressurized gas storage power plant 1 is also to be operated with alternating pressure ratios between the storage chambers 11, 12, in such a way that the higher pressure also prevails from time to time in storage chamber 12, it is advantageous to arrange a further heating device 33 in the feed line 18 from storage chamber 12 to the expansion machine 21.

A heated heat storage medium 34 that is stored in a tank 32 can flow through the heating device 33, for example. The heat storage medium 34 can be pumped through the heating device 33, driven by a pump 31 for example, via lines 30. The heat storage medium 34 can be heated in the tank 32, e.g. by means of excess electric energy from the energy supply grid 2, or from other sources, e.g. by heat which arises during compression in the compression machine 22, or from one of the other energy or heat sources already mentioned.

Two example calculations of the energy output process by the expansion of the pressurized gas by means of the expansion machine 21 are illustrated below. Let it be assumed that a pressure of 228 bar is present in storage chamber 11. The pressurized gas 4 under this pressure is passed through the expansion machine 21 via line 17. After expansion, the pressurized gas is passed into storage compartment 12 via a line 18. Let it be assumed that the pressure in storage compartment 12 has a value of 81.2 bar after the introduction of the pressurized gas from the expansion machine 21. Let the temperature after mixing with the pressurized gas introduced be 31.1 degrees Celsius.

If this expansion process is carried out without additional heat being supplied by means of the heating device 33, there is a pressure change from 209.8 bar to 108.1 bar during the expansion process carried out in the expansion machine 21, wherein a power of 421 kW is generated at the expansion machine. The compression ratio between the higher and the lower pressure is 1.94 here.

If additional heat is supplied to the pressurized gas 4 by means of the heating device 33, e.g. a temperature increase of the pressurized gas by 20° C., a power of 678 kW, and thus a power increase of 257 kW, is achieved at the expansion machine. In this context, a relatively small expansion machine with a flow rate of 20,000 m³/h of pressurized gas is assumed.

If a larger turbine is used, e.g. one with a flow rate of 150,000 m³/h, a pressure change from 210.26 bar to 107.96 bar occurs at the expansion machine during the expansion process with the same initial data. During this process, a power of an expansion machine of 3.168 MW is generated. Here, the compression ratio is 1.95. This applies without additional heat being supplied. With additional heat being supplied by the heating device 33, resulting in a temperature increase of the pressurized gas 4 of 25° C., a power of 5.474 MW, and thus a power increase of 2.306 MW, is achieved at the expansion machine. The thermal power supplied to the system of in this case 2.254 MW is fully converted and, in the present example, the efficiency of the overall system is even increased through the change in the specific heat of the pressurized gas 4.

The invention claimed is:

1. A method for storing energy and for dispensing energy into an energy supply grid by a pressurized gas storage power plant, comprising:
    storing energy by compressing pressurized gas taken from a first storage chamber with a compression machine to produce compressed pressurized gas, and routing the compressed pressurized gas into a second storage chamber that is different from the first storage chamber; and
    dispensing energy by expanding the compressed pressurized gas taken from the second storage chamber by routing the compressed pressurized gas through an expansion machine to produce expanded pressurized gas, wherein the expansion machine dispenses energy to the energy supply grid; and
    heating the compressed pressurized gas by no more than 50 degrees Celsius with a heating device after the compressed pressurized gas leaves the second storage chamber and before or during supply of the compressed pressurized gas to the expansion machine, wherein heat for the heating step is supplied from a heat source different than the first and second storage chambers.

2. The method as claimed in claim 1 wherein a pressure ratio between pressures in the first storage chamber and the second storage chamber is no more than 1 to 5.

3. The method as claimed in claim 1 wherein the heating device is connected to a heat storage system, in which there is a preheated heat storage medium, and wherein the heating step includes passing the preheated heat storage medium through the heating device to heat the compressed pressurized gas.

4. The method as claimed in claim 3 wherein the preheated heat storage medium is a liquid with a boiling temperature of no more than 100 degrees Celsius at 1.013 bar atmospheric pressure.

5. The method as claimed in claim 1 wherein the compressed pressurized gas is heated by heat produced and stored during compression of the compressed pressurized gas, by energy supplied from renewable energy sources and/or by geothermal energy.

6. A pressurized gas storage power plant, comprising:
    at least one first storage chamber;
    at least one second storage chamber separate from the at least one first storage chamber;
    pressurized gas lines;
    at least one compression machine;
    at least one expansion machine, wherein the at least one compression machine and/or the at least one expansion machine are connected to the at least one first storage chamber and/or the at least one second storage chamber via the pressurized gas lines, either permanently or via switchable valves, wherein the at least one compression machine is configured for production of compressed pressurized gas to be stored in the second storage chamber, and wherein the at least one expansion machine is configured for expansion of the compressed pressurized gas taken from the second storage chamber;
    a heat source different than the first and second storage chambers;

a heating device configured for heating the compressed pressurized gas with heat from the heat source by no more than 50 degrees Celsius after the compressed pressurized gas leaves the second storage chamber and before or during supply of the compressed pressurized gas to the expansion machine; and a control device configured to control one or more of the at least one compression machine, the at least one expansion machine, the heating device, and the switchable valves.

7. A pressurized gas storage power plant configured for carrying out a method as claimed in claim 1.

8. The pressurized gas storage power plant as claimed in claim 6 further comprising a control device which controls the at least one compression machine, the at least one expansion machine, and the at least one heating device so as to store and dispense energy into an energy supply grid.

9. The pressurized gas storage power plant as claimed in claim 6, wherein the control device is an electronic control device.

10. The pressurized gas storage power plant as claimed in claim 9, wherein the electronic control device comprises a processor.

11. The pressurized gas storage power plant as claimed in claim 10, wherein the processor is configured to execute a computer program for controlling the one or more of the at least one compression machine, the at least one expansion machine, the heating device, and the switchable valves.

* * * * *